Oct. 11, 1966  V. CLAIR, JR  3,277,559
METHOD OF COLD PRESSURE WELDING
Filed Aug. 9, 1963
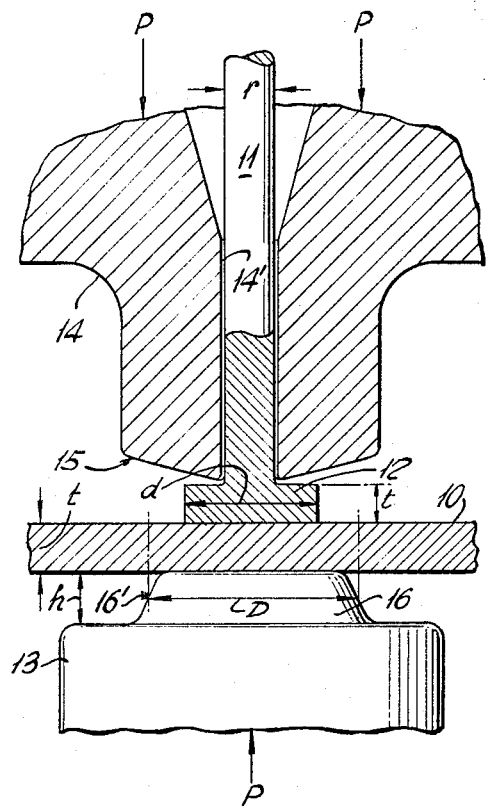
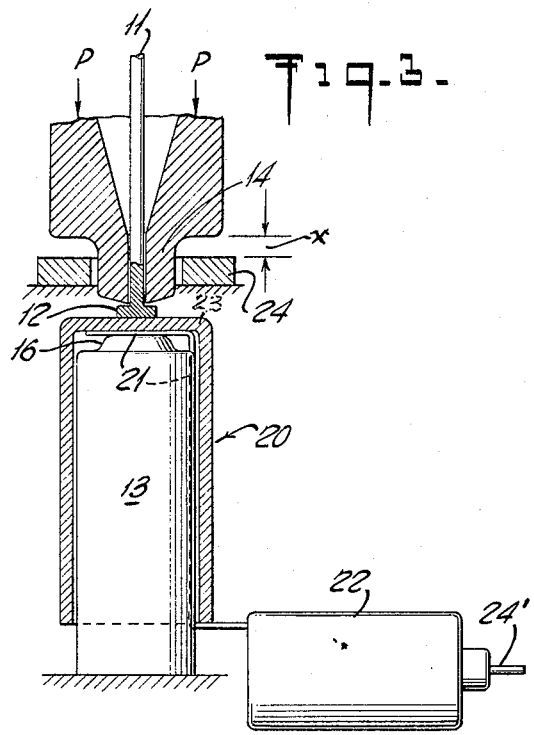
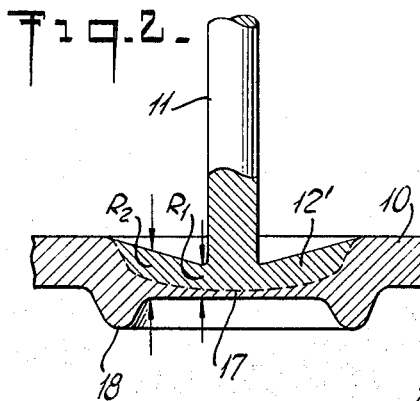
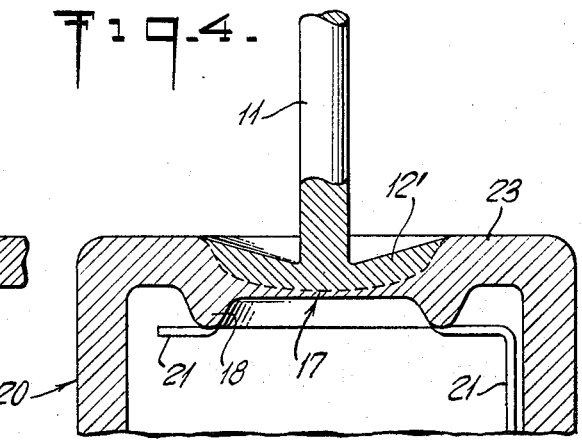
INVENTOR.
VERNE CLAIR, JR.
BY
ATTORNEY

United States Patent Office 3,277,559
Patented Oct. 11, 1966

3,277,559
METHOD OF COLD PRESSURE WELDING
Verne Clair, Jr., New Hartford, N.Y., assignor to Kelsey-Hayes Company, Romulus, Mich., a corporation of Delaware
Filed Aug. 9, 1963. Ser. No. 300,968
14 Claims. (Cl. 29—155.5)

The present invention relates to a method of pressure welding two metal members of aluminum, copper, or the like ductile or cold pressure weldable metal, more particularly to the joining of a first member of relatively small size to a second member of larger size or area, such as a metal sheet or plate.

While suitable for other uses and applications, as will become more apparent as the description proceeds, the improvement disclosed herein is especially adapted for the joining of a headed wire member unto a plate or metal sheet by the aid of the improved cold pressure welding technique according to the invention, that is, using pressure only for effecting a solid phase welding bond between the members and substantially without resort to any external welding heat.

As is well known, in cold pressure welding, as described for instance in greater detail in U.S. Patent No. 2,522,408, a suitable design of the pressure welding tools or dies and control of the tool pressure or distortion of the members resulting therefrom, after suitably cleaning the areas of contact to be joined to remove objectionable oxide and other surface contamination, will result in the creation of an adequate interfacial metal flow or intense interaction between the members such as to effect the formation of a solid phase welding bond or joint.

There has already been proposed by U.S. Patent No. 2,703,998 a method of welding in the form of a lap joint a first member, such as the flange of a headed wire, to a second relatively larger member, such as a wall portion of a metal container, said method comprising the steps of placing said first member in contacting relation with said second member, applying to a localized strip-like area of the contacting members spaced from and close to the periphery of the first member a pressure, to effect an indentation of predetermined percentage metal reduction of the members at said area and to thereby create an intense interfacial metal flow conductive to joining the members in a solid phase welding bond thereat, while extending the pressure application over the remaining area of the first member, in such a manner as to embed the same in the second member upon welding.

While a pressure welding technique of the type aforedescribed may be employed practically for the welding of members of relatively large size or dimension, ever increasing difficulties are encountered as the dimension of the members is reduced until reaching a lower limit where a design and operation of the welding tools becomes practically unfeasible by virtue of the small magnitude or "minitude" of the parts or tools involved. A case in point is the example of a headed terminal or flexible pigtail wire as used in electrical device fabrication and which it is desired to weld unto the outside of a metal casing housing a device, such as a capacitor, inductor, etc., to provide both a terminal connector and mounting means in a manner well known.

Another drawback of the known method of welding a headed terminal wire or rod unto a sheet or metal plate is due to the fact that the joint is limited to the relatively small (indented) weld area, whereby to result in a relatively high electrical transition resistance between the terminal and casing, aside from the relatively low strength of the joint due to the relatively small weld area, a disadvantage being especially felt where a flexible wire lead, besides effecting electrical contact, also serves as a supporting or mounting means of the device, as is customary and common practice in electrical device fabrication and assembly.

Accordingly, an important object of the present invention is the provision of an improved method or technique of cold pressure welding a relatively small member, such as a disk, flange, etc., to a relatively larger member in the form of a metal plate, sheet, container wall or the like, by which the prior and related difficulties and drawbacks are substantially eliminated or minimized; by which the members will be joined mechanically as well as electrically by a solid phase welding bond of maximum weld area at the interface; by which the metal flow at the interface to effect pressure welding and the resultant metal distortion is utilized to reinforce the joint being formed; which method can be practiced efficiently and expeditiously by the use of relatively simple welding tools or dies; which can be used in connection with relatively small members such as for the welding of a headed electrical terminal and mounting wire or lead to the casing housing an electrical device; and which technique as applied to the welding of a terminal and/or mounting wire is especially suited for the simultaneous welding of a terminal tab leading from the electrical device to the inside of the container, to effect a double joint by means of a single pressure or welding operation.

The invention, both as to the foregoing and ancillary objects as well as novel objects thereof, will be better understood from the following detailed description of a preferred practical embodiment, taken in conjunction with the accompanying drawings forming part of this specification and in which:

FIG. 1 is a partial cross-section, shown on an enlarged scale, of a tool arrangement for the cold pressure welding of a flanged or headed wire member unto a sheet or plate-like member in accordance with the improved technique embodying the principles of the present invention, the parts of the tool being shown in their position prior to welding;

FIG. 2 is a cross-section through the joint between the members of FIG. 1 after welding;

FIG. 3 shows the same tool arrangement as applied to the welding of a terminal pigtail wire to the outside of a metal casing and the simultaneous welding of a terminal tab to the inside of said casing by a single welding step in accordance with the invention; and FIG. 4 is a cross-section on an enlarged scale of the composite joint resulting from the welding operation according to FIG. 3.

Like reference numerals denote like parts in the different views of the drawings.

With the foregoing objects in view, the invention, according to one of its aspects, involves generally the provision of an improved technique or method of pressure welding a first preferably disk-shaped member unto a second flat and relatively larger member such as, for instance, the welding of the flange of a headed wire terminal unto the outside of a metal casing housing an electrical device, both said members consisting of cold pressure weldable metal and and said method comprising essentially the steps of superimposing the first member upon the second member while supporting the latter, by means of an anvil of suitable shape and dimension and forming a first tool member, over a localized area concentric to and extending beyond the periphery of said disk or first member, and applying to said first member, by means of a suitably shaped cooperating tool member or die, a pressure starting near the center and being extended progressively towards its periphery as the pressure application is continued and until effecting a predetermined percentage reduction of said members, whereby to flatten and to convexly distort said first member in respect to and to substantially embed the same in said second member. There is created in this manner as a result of said pressure application and distortion of the members resulting therefrom an intense interfacial metal flow or interaction conducive to producing a solid phase welding bond or joint extending over substantially the entire initial interface between the members, to in turn result in both an efficient mechanical joint and an intimate electrical connection of minimum transition resistance. Furthermore, due to the specific relation of and variation of the supporting or pressure areas of the members during welding, as described in further detail in the following, the metal displaced during welding is allowed to flow laterally outwardly along the interface and beyond and at right angle to the pressure or supporting area, to thereby produce a reinforcing rib surrounding and strengthening the joint formed.

As will be understood, the areas of contact to be joined are advantageously cleaned prior to welding, such as by a scratch brushing treatment to remove disturbing oxide and other surface contamination impeding or preventing pressure welding, in a manner well known in the art.

In the case of welding a terminal wire to a metal casing by the process referred to, a terminal tab extending from the device to be housed in said casing may be simultaneously pressure welded to the inside of the container wall, by the same welding step or operation, to effect a continuous electrical connection from the device to the terminal wire or lead, in a manner as will become further apparent from the following detailed description of the drawings.

Referring more particularly to FIG. 1, the numeral 10 denotes a metal sheet or the like first member, such as the wall portion of a metallic container, FIG. 3, said member consisting of cold pressure weldable metal, such as aluminum, copper, etc. Item 11 denotes a second member in the form of a wire lead in the example shown and also consisting of pressure weldable material, said wire being provided with a head or flange 12 to be welded unto the plate or member 10. For this purpose, the wire 11 is arranged with its flange in contact with the member 10 as shown in the drawing by inserting the members in a suitable pressure welding tool comprising a lower anvil or tool member 13 which engages or supports the member 10 and an upper cooperating die or tool member 14 adapted to hold or clamp the wire 11. Member 14 has a pressure-applying surface or die face 15 slanting in the upward direction from the center to the periphery of the flange 12 and consists preferably of a two-part or split structure providing a central bore 14' for the easy insertion and clamping of the wire by spring presure, in the manner well known and understood.

The anvil 13 has a projection 16 forming an indenter concentric with the disk or flange 12 and having an average diameter D which is at least equal to and preferably exceeds the disk diameter d of said flange. The lateral contour of the indenter 16 projecting beyond the periphery of the flange or disk 12 is suitably curved or chamfered, as at 16', for the purpose as will become more apparent as the description proceeds.

The areas of contact of the members 10 and 12 to be joined are advantageously cleaned, such as by mechanical scratch brush treatment, to remove objectionable oxide and other surface contamination liable to impede or prevent pressure welding, in a manner well known in connection with cold pressure welding technique.

In operation, as pressure is applied to the tool members 13 and 14 at right angle to the interface between the members 10 and 12 to be welded, as indicated by the arrows P in the drawing, and by the aid of a suitable pressure tool or press (manual, pneumatic, etc.), the pressure application on the flange 12 is initially limited to the region adjoining the perimeter of the wire 11, whereupon the pressure area is progressively extended outwardly towards the periphery of said flange as a result of the slanting face 15 of the die or tool member 14. As a consequence, the flange 12 is flattened and distorted convexly in respect to and embedded in the member 10, as shown at 12' in FIG. 2. At the same time, the member 10 is distorted by the indenter 16 of the anvil 13, whereby to create an intense lateral or outward plastic metal flow at the interface between the members conducive, in conjunction with the flattening action or expansion of the flange 12, to joining the members in a solid phase interfacial bond or joint, as indicated by the dotted line 17 in the drawing, although practically no boundary line exists between the members as a result of the solid phase or true welding bond or joint being formed by pressure welding. In other words, the intense interfacial action or plastic metal flow required for effecting pressure welding is predicated, in the case of the special joint and technique forming the subject of the present invention, on the combined effects of the indentation of the relatively larger member 10 by the indenter 16, on the one hand, and the convex distortion and resultant interfacial coexpansion of the smaller member 12, on the other hand. As a consequence, the difficulties of indenting the members along a relatively narrow and linear area are eliminated by the invention, while at the same time producing a more efficient joint both from a mechanical and electrical viewpoint mainly as a result of the increased weld area and reduced transition resistance, respectively.

In order to allow the metal, especially of the member 10, displaced during welding to readily flow laterally and outwardly of the interface, the periphery or mean diameter D of the indenter 16 advantageously extends slightly beyond the initial periphery or diameter d of the disk or smaller member 12, in such a manner as to act as a guide in enabling the displaced metal to flow along the contour 16' in the outward direction and transversely to the member 10 and to thereby result in the formation of a ring-shaped projection or reinforcing rib 18 encircling and strengthening the weld joint formed, in the manner shown by and further understood from FIG. 2.

In the case of the flange 12 having a thickness $t$—which in the case of a headed wire may advantageously have a diameter about three times the wire diameter $r$—about equal to the thickness of the member 10, as shown in the drawing, satisfactory results have been obtained with a mean diameter D of the indenter 16 exceeding the flange diameter $d$ by about $2t$, although these values may be varied within limits, to suit existing conditions and requirements.

The total percentage reduction of the members 10 and 12, or residual metal thickness at the weld, depends on the "figure of merit" or cold weldability of the metal. As will be seen, the reduction is greater or the residual thickness $R_1$, FIG. 2, is less at the region near the wire 11 and the residual thickness $R_2$ is greater at the periphery of the distorted flange 12'. In the case of aluminum, $R_1$ may be about 20% and $R_2$ about 30% of the initial total thickness of the members, whereby to result in an average total reduction of about 75% which corresponds to the "figure of merit" of aluminum as cold pressure weldable metal. In the case of copper, $R_1$ may be about 10% and $R_2$ about 20%, resulting in an average reduction of 85% corresponding to the "figure of merit" for copper. If the wire 11 consists of copper and the member 10 of aluminum, or vice versa, satisfactory results may be obtained with the values for either metal, preferably with those of the harder metal, or with values intermediate those for both said metals, respectively.

In order to control the percentage reduction or residual metal thickness $R_1$ and $R_2$, respectively, the tool members 13 and 14 may be fitted with suitable stop or abutment means well known and shown in FIG. 3. Referring to the latter, there is shown a welding tool being similar to that of FIG. 1 and adapted especially for the welding of a headed pigtail or terminal wire to the outside bottom surface of a cylindrical container and for the welding at the same time of a terminal strip or tab to the inside of a container, to effect an electrical connection between an electrical device to be mounted in the container and said terminal which may also serve as a supporting or mounting means, in the manner customary in electrical device fabrication.

For the latter purpose, the anvil 13 of FIG. 3 has the shape of a cylinder over which is placed the container 20 of aluminum or the like pressure weldable metal with the terminal tab 21 consisting also of aluminum and projecting from the device 22 to be mounted having its end interposed between the indenter 16 and the inside of the bottom wall 23 of the container. Tool member 14 holding the wire 11 may be the same as in FIG. 1 and is shown provided with a ring-shaped stop or abutment block or member 24 to limit the tool penetration or percentage reduction of the members, the latter being determined by the initial distance $x$ between said abutment and the member 14. Welding pressure P applied in the manner described results in the welding, in a single step, of both the wire 11 and of the tab 21 to the container wall with the tab being mainly connected to the ribs 18, as more clearly shown in FIG. 4. The slanting angle of the die face 15 may be suitably chosen to result in a substantially complete impression or embedment of the flange 12 in the member 10, as shown in the drawing, upon reaching the proper reduction of the members to effect pressure welding in the manner described. After welding, the device 22 (capacitor, inductor, etc.) having a cooperating terminal 24′ may be mounted in the casing 20 and the latter sealed in accordance with ordinary practice.

In the foregoing, the invention has been described in reference to a specific illustrative method and welding tool. It will be evident, however, that variations and modifications, as well as substitution of equivalent elements or steps, may be used in accordance with the broader scope and spirit of the invention as set forth in the appended claims. The specification and drawings are accordingly to be regarded in an illustrative rather than in a restrictive sense.

I claim:

1. A method of pressure welding a first disk-like member to a second flat and relatively larger member, both said members consisting of cold pressure weldable metal, said method comprising the steps of superimposing said first member upon said second member, supporting said second member over a localized pressure area concentric and opposite to and extending beyond the periphery of said first member, and applying to said first member a pressure starting near the center and being extended progressively towards the periphery thereof as the pressure application is continued, until effecting a predetermined average percentage reduction of said members, whereby to flatten and convexly distort said first member in respect to and to substantially embed the same in said second member and to thereby create an intense interfacial metal flow conducive to producing a solid phase welding joint extending over substantially the entire interface between said members, while allowing the metal displaced during welding to flow laterally outwardly beyond and at right angle to said area, to thereby produce a reinforcing rib surrounding said joint.

2. In a method of cold pressure welding two members as claimed in claim 1, both said members consisting of aluminum and the total average percentage reduction of the members at the weld joint being about 75%.

3. In a method of cold pressure welding two members as claimed in claim 1, said first member consisting of copper and said second member consisting of aluminum, and the total average percentage reduction of the members at the weld joint being about 80%.

4. In a method of cold pressure welding two members as claimed in claim 1, the step of cleaning the areas to be joined of said members to provide pure metallic surfaces prior to welding.

5. A method of pressure welding a first member composed of a wire having a flange at one end and consisting of cold pressure weldable metal unto a plate-like member also consisting of cold pressure weldable metal, said flange and second member being of about equal thickness and said flange having a diameter of about three to four times said thickness, said method comprising the steps of superimposing said flange upon said second member, supporting said second member over a localized pressure area opposite and concentric to said flange and extending beyond the periphery thereof, and applying to said flange a pressure starting near said wire and being extended progressively towards the periphery of said flange as the pressure application is continued, until effecting a predetermined average percentage reduction of said flange and second member, whereby to flatten and convexly distort said flange in respect to and to substantially embed the same in said second member, to thereby create an intense interfacial metal flow conducive to producing a solid phase welding joint extending over substantially the entire interface between said flange and said second member, while allowing the metal displaced during welding to flow laterally outwardly beyond and transversely to said area, to thereby produce a reinforcing rib surrounding said joint.

6. In a method of cold pressure welding as claimed in claim 5, the step of gradually increasing said pressure area starting with a minimum at the beginning to a maximum at the end of a pressure application cycle, respectively.

7. In a method of cold pressure welding as claimed in claim 5, the step of gradually increasing said pressure area from a first diameter about equal to the diameter of said flange at the beginning of a pressure application cycle to a second diameter in excess of said first diameter by about twice the thickness of said flange at the end of a pressure application cycle.

8. In a method of cold pressure welding two members as claimed in claim 5, both said members consisting of aluminum and the average percentage reduction of said flange and second member at the weld joint being about 75%.

9. In a method of cold pressure welding two members as claimed in claim 5, said wire consisting of copper and said second member consisting of aluminum, and the average percentage reduction of said flange and said second member at the weld joint being about 80%.

10. In a method of cold pressure welding two members as claimed in claim 5, said second member forming part of the wall of a metallic casing housing an electrical device, a terminal tab of cold pressure weldable metal extending from said device, the step of interposing said tab between said container wall and said area, to pressure weld said tab to said container simultaneously with the welding of said flange.

11. A method of connecting a terminal tab consisting of pressure weldable metal and extending from an electrical device to a cylindrical container adapted to house said device and also consisting of cold pressure weldable material and simultaneously connecting a terminal wire having a flange at one end to the outside of said container, said method comprising the steps of supporting said container by a cylindrical anvil providing a localized pressure area supporting the inside of the bottom wall of said container and having a diameter in excess of the diameter of said flange, interposing the end of said tab between said anvil and said bottom wall, positioning said wire with its flange engaging the outside of said bottom wall concentrically with said pressure area, and applying to said flange a pressure starting near said wire and being progressively extended towards the periphery thereof as the pressure application is continued until effecting a predetermined percentage reduction of said flange and wall, whereby to flatten and convexly distort said flange in respect to and substantially embedded the same in said wall, to thereby create an intense interfacial metal flow conductive to producing a first solid phase welding joint extending over substantially the entire interface between said flange and wall, while allowing the metal displaced during welding to flow laterally outwardly and transversely to said area, thereby to produce a reinforcing rib surrounding said joint and welded to said tab by a further solid phase joint.

12. In a method of cold pressure welding two members as claimed in claim 11, the step of gradually increasing said pressure area starting from the beginning to the end of a pressure application cycle.

13. In a method of cold pressure welding of two members as claimed in claim 11, said flange and bottom wall having a thickness about equal to the diameter of said wire, said flange having a diameter about three to four times said thickness, and said pressure area having an initial diameter about equal to said flange and a final diameter in excess of said flange by about twice said thickness.

14. In a method of cold pressure welding two members as claimed in claim 11, said container and tab consisting of aluminum and said wire consisting of copper, and the average percentage of the metal at the weld being about 80% of the initial thickness of said flange and wall.

References Cited by the Examiner
UNITED STATES PATENTS

| | | | |
|---|---|---|---|
| 2,763,057 | 9/1956 | Clair | 29—470.1 |
| 2,894,321 | 7/1959 | Dubilier | 29—470.1 |

JOHN F. CAMPBELL, *Primary Examiner.*